United States Patent
Travostino et al.

(10) Patent No.: US 9,967,793 B2
(45) Date of Patent: May 8, 2018

(54) SYSTEMS AND METHODS FOR AVOIDING STALLS IN NETWORK CONNECTIVITY AT A COMPUTING DEVICE

(71) Applicant: Apple Inc., Cupertino, CA (US)

(72) Inventors: Franco Travostino, San Jose, CA (US);
Vu H. Chiem, San Jose, CA (US);
Thomas F. Pauly, Cupertino, CA (US);
Padmavathy Bhooma, San Jose, CA (US)

(73) Assignee: Apple Inc., Cupertino, CA (US)

( * ) Notice: Subject to any disclaimer, the term of this patent is extended or adjusted under 35 U.S.C. 154(b) by 65 days.

(21) Appl. No.: 14/866,796

(22) Filed: Sep. 25, 2015

(65) Prior Publication Data

US 2016/0360461 A1 Dec. 8, 2016

Related U.S. Application Data

(60) Provisional application No. 62/172,204, filed on Jun. 7, 2015.

(51) Int. Cl.
| | |
|---|---|
| *H04Q 7/10* | (2006.01) |
| *H04W 36/30* | (2009.01) |
| *H04W 36/14* | (2009.01) |
| *H04W 76/02* | (2009.01) |
| *H04W 36/00* | (2009.01) |
| *H04W 40/02* | (2009.01) |
| *H04W 40/12* | (2009.01) |

(52) U.S. Cl.
CPC ....... *H04W 36/30* (2013.01); *H04W 36/0022* (2013.01); *H04W 36/14* (2013.01); *H04W 40/02* (2013.01); *H04W 40/12* (2013.01); *H04W 76/026* (2013.01)

(58) Field of Classification Search
CPC ..... H04W 36/14; H04W 48/18; H04W 48/20; H04W 36/16; H04W 48/08; H04W 48/16; H04W 88/06
USPC ................... 455/434, 435.1, 435.2, 436–438
See application file for complete search history.

(56) References Cited

U.S. PATENT DOCUMENTS

| | | | |
|---|---|---|---|
| 8,451,752 B2 | 5/2013 | Lu | |
| 8,514,717 B2 * | 8/2013 | Chow | H04W 48/08 370/237 |

(Continued)

*Primary Examiner* — Ankur Jain
*Assistant Examiner* — Julio Perez
(74) *Attorney, Agent, or Firm* — Dickinson Wright RLLP (57) ABSTRACT

The embodiments set forth techniques for avoiding network connectivity stalls at a mobile computing device. In an idle state, a performance analyzer executing on the mobile computing device is configured to passively analyze high-level network connectivity information to detect any minor issues with the network connectivity being provided by a primary interface (e.g., WiFi). When minor issues are detected, the mobile computing device transitions into an alerted state, where high emphasis is placed on using the WiFi interface and low emphasis is placed on using a secondary interface (e.g., Cellular). In the alerted state, the mobile computing device actively analyzes low-level connectivity information to detect any major issues with the WiFi interface. When major issues are detected, the mobile computing device transitions into a fallback state, where high emphasis is placed on using the Cellular interface and low emphasis is placed on using the WiFi interface.

21 Claims, 4 Drawing Sheets

(56) References Cited

U.S. PATENT DOCUMENTS

| | | | |
|---|---|---|---|
| 8,583,765 B1* | 11/2013 | Rachabathuni | G06F 13/00 709/219 |
| 8,825,108 B2 | 9/2014 | LaBauve et al. | |
| 2008/0119165 A1 | 5/2008 | Mittal et al. | |
| 2010/0184440 A1* | 7/2010 | Mao | H04W 48/18 455/437 |
| 2011/0319073 A1* | 12/2011 | Ekici | H04W 48/18 455/426.1 |
| 2012/0140651 A1* | 6/2012 | Nicoara | H04W 48/18 370/252 |
| 2013/0122910 A1 | 5/2013 | Singh et al. | |
| 2013/0225161 A1 | 8/2013 | Chhabra et al. | |
| 2014/0235244 A1* | 8/2014 | Hinman | H04W 48/18 455/436 |

* cited by examiner

SYSTEMS AND METHODS FOR AVOIDING STALLS IN NETWORK CONNECTIVITY AT A COMPUTING DEVICE

CROSS-REFERENCE TO RELATED APPLICATIONS

The present application claims the benefit of U.S. Provisional Application No. 62/172,204, entitled "SYSTEMS AND METHODS FOR AVOIDING STALLS IN NETWORK CONNECTIVITY AT A COMPUTING DEVICE," filed Jun. 7, 2015, the content of which is incorporated herein by reference in its entirety for all purposes.

FIELD

The described embodiments set forth techniques for avoiding stalls in network connectivity at a computing device.

BACKGROUND

Presently, it is common for a mobile computing device (e.g., a smartphone or a tablet) to include two or more different types of communications interfaces (e.g., WiFi and Cellular) that conveniently enable the mobile computing device to access a variety of networks. Typically, network communications generated within the mobile computing device (e.g., by applications executing on the mobile computing device) are directed toward a particular one of the communications interfaces in accordance with network availability. According to most configurations, when a WiFi network is available, the WiFi communications interface is preferable over the Cellular communications interface as WiFi connectivity tends to be faster, cheaper in cost, and more power efficient than Cellular connectivity. Beneficially, when the WiFi communications interface is incapable of establishing network connectivity—e.g., when no WiFi networks are within range—the mobile computing device can transition into using the Cellular communications interface, thereby providing, at least in most cases, a nearly seamless sense of network connectivity to a user of the mobile computing device.

Unfortunately, in some cases, network connectivity stalls can take place when the mobile computing device fails to identify that it would be prudent to transition from using the WiFi communications interface to using the Cellular communications interface. More specifically, it can be prudent to transition when, for example, the mobile computing device is at the edge of coverage of a WiFi network (e.g., in the user's driveway), and network connectivity is identified as being intact even when the quality of the WiFi network connectivity is poor. Consequently, the mobile computing device often remains connected to the WiFi network and delays or foregoes attempting to alleviate the problem (e.g., by connecting to another available network). This is unfortunate considering that the Cellular communications interface often can readily establish network connectivity that is higher-quality than the poor-quality WiFi network.

SUMMARY

The described embodiments set forth techniques for avoiding stalls in network connectivity at a mobile computing device. In particular, the techniques involve configuring the mobile computing device to identify when a primary network connection is poor in quality (e.g., a weak WiFi signal) and to attempt transitioning to a secondary network connection that is higher in quality (e.g., a Cellular network).

One embodiment sets forth a method for avoiding network connectivity stalls at a mobile computing device. Specifically, the method is implemented at a communications interface performance analyzer executing on the mobile computing device, and includes the steps of (1) analyzing a first category of network connectivity information available within the mobile computing device, (2) determining, based on analyzing the first category of network information, that first-level connectivity performance issues are occurring, and (3) upon determining that the first-level connectivity performance issues are occurring: causing an emphasis to be placed on using a first type of communications interface over a second type of communications interface when applications executing on the mobile computing device attempt to establish new network connections.

Another embodiment sets forth a non-transitory computer readable storage medium configured to store instructions that, when executed by a processor included in a mobile computing device, cause the mobile computing device to carry out steps that include (1) analyzing a first category of network connectivity information available within the mobile computing device, (2) determining, based on analyzing the first category of network information, that first-level connectivity performance issues are occurring, and (3) upon determining that the first-level connectivity performance issues are occurring: causing an emphasis to be placed on using a WiFi communications interface included in the mobile computing device over a Cellular communications interface included in the mobile computing device when applications executing on the mobile computing device attempt to establish new network connections.

Yet another embodiment sets forth a mobile computing device configured to avoid network connectivity stalls. Specifically, the mobile computing device includes a (1) WiFi communications interface, (2) a Cellular communications interface, and (3) a processor configured to implement a performance analyzer that carries out steps that include (i) analyzing a first category of network connectivity information available within the mobile computing device, (ii) determining, based on analyzing the first category of network information, that first-level connectivity performance issues are occurring, and (iii) upon determining that the first-level connectivity performance issues are occurring: causing an emphasis to be placed on using the WiFi communications interface over the Cellular communications interface when applications executing on the mobile computing device attempt to establish new network connections.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments set forth techniques for avoiding network connectivity stalls at a mobile computing device. In an idle state, a performance analyzer executing on the mobile computing device is configured to passively analyze high-level network connectivity information to detect any minor issues (referred to herein as "first-level connectivity performance issues") with the network connectivity being provided by a primary interface (e.g., WiFi). When minor issues are detected, the mobile computing device transitions into an alerted state, where high emphasis is placed on using the WiFi interface and low emphasis is placed on using a secondary interface (e.g., Cellular). In the alerted state, the mobile computing device can be configured to actively analyze low-level connectivity information, system properties associated with the mobile computing device, and the like, to detect any major issues (referred to herein as "second-level connectivity performance issues") that are occurring with the WiFi interface and its associated network connection(s) (if any). When major issues are detected, the mobile computing device transitions into a fallback state, where high emphasis is placed on using the Cellular interface and low emphasis is placed on using the WiFi interface.

Although the present disclosure primarily describes WiFi and Cellular interfaces, it is noted that the various techniques set forth herein can apply to different kinds of communications interfaces that enable the mobile computing device to carry out communications with external entities. Moreover, it is noted that the various techniques are not limited in application to a maximum of two network communications interfaces, but that the techniques can be expanded to apply to any number of network communications interfaces included in the mobile computing device. For example, and as described in greater detail herein, the state that influences the manner in which new network connections are established via the network communications interfaces can be expanded to provide finer-granularity operating conditions. More specifically, the state can be expanded to account for increased numbers of network communications interfaces that are included in the mobile computing device, and can provide hybrid approaches (between any number of network communications interfaces) to promote a seamless transition experience to the user of the mobile computing device.

According to some embodiments, the network services manager can be configured to implement and maintain "network services state," which can include different types of state that affect the manner in which network connections are established and utilized by applications executing on the mobile computing device. The network services state can include, for example, "WiFi only" state that indicates only WiFi should be used, "WiFi preferred" state that indicates WiFi is the preferred connection and Cellular is the fallback connection, "Cellular preferred" state that indicates Cellular is the preferred connection and WiFi is the fallback connection, and "Cellular only" state that indicates only Cellular should be used. According to some embodiments, the WiFi only state can represent a conventional condition where network connectivity via the Cellular component is disabled or no Cellular networks are available. Similarly, the Cellular only state can represent a conventional condition where network connectivity via the WiFi component is disabled or no WiFi networks are available. In contrast, and as described in greater detail herein, the WiFi preferred state and the Cellular preferred state can represent hybrid states where network connectivity using a particular component is preferred, but not mandatory. According to some embodiments, and as described in greater detail herein, the network services manager can be configured to apply the WiFi preferred state and the Cellular preferred state in response to state changes that are issued within the mobile computing device in order to provide a more seamless transition between network connectivity when issues arise.

The embodiments set forth herein also involve a policy manager that enforces various policies that are specific to the applications executing on the mobile computing device. For example, configuration settings maintained by the policy manager can indicate that a particular application is not permitted to establish network connections using the Cellular component (and instead is only able to utilize the WiFi component). Notably, the policy manager can be configured to receive and process state changes from the performance analyzer so that the policy manager can, in conjunction with the network services manager, properly enforce existing policies within the mobile computing device even when the state changes are issued.

The performance analyzer can be configured to issue the state changes described herein that cause the policy manager and the network services manager to adjust the manner in which they operate. According to some embodiments, the performance analyzer can be configured to carry out passive, high-level probing of high-level network information, which can include Address Resolution Protocol (ARP) information, Domain Name System (DNS) information, historical WiFi connection information, received signal strength indication (RSSI) information, Cellular connection information, Global Positioning System (GPS) information (e.g., to detect whether the mobile computing device is stationary or in motion, which can influence decisions to transition from WiFi to Cellular), and the like. The performance analyzer can also be configured to carry out passive, high-level probing of system properties of the mobile computing device, which can include, for example, information that indicates whether the mobile computing device is in a locked mode (e.g., the screen is off), whether the mobile computing device is being actively operated by the user, and the like. The performance analyzer can also be configured to provide an active, low-level probing of low-level network information. Specifically, and according to some embodiments, the performance analyzer can be configured communicate low-level probe requests and responses with a network kernel stack, which is a component that is capable of accessing low-level network information within the mobile computing device. According to some embodiments, the low-level network information can include Transmission Control Protocol (TCP) information for existing or previous network connections. For example, for an existing network connection, the TCP information can indicate whether a TCP connection was successfully established using the existing network connection, whether data packets are currently being transmitted over the existing network connection, and whether any response data packets have been received over the network connection.

Accordingly, the embodiments described herein set forth techniques for avoiding network connectivity stalls at a mobile computing device. A more detailed discussion of these techniques is set forth below and described in conjunction with FIGS. 1-4, which illustrate detailed diagrams of systems, methods, and user interfaces that can be used to implement these techniques.

Figure 1:
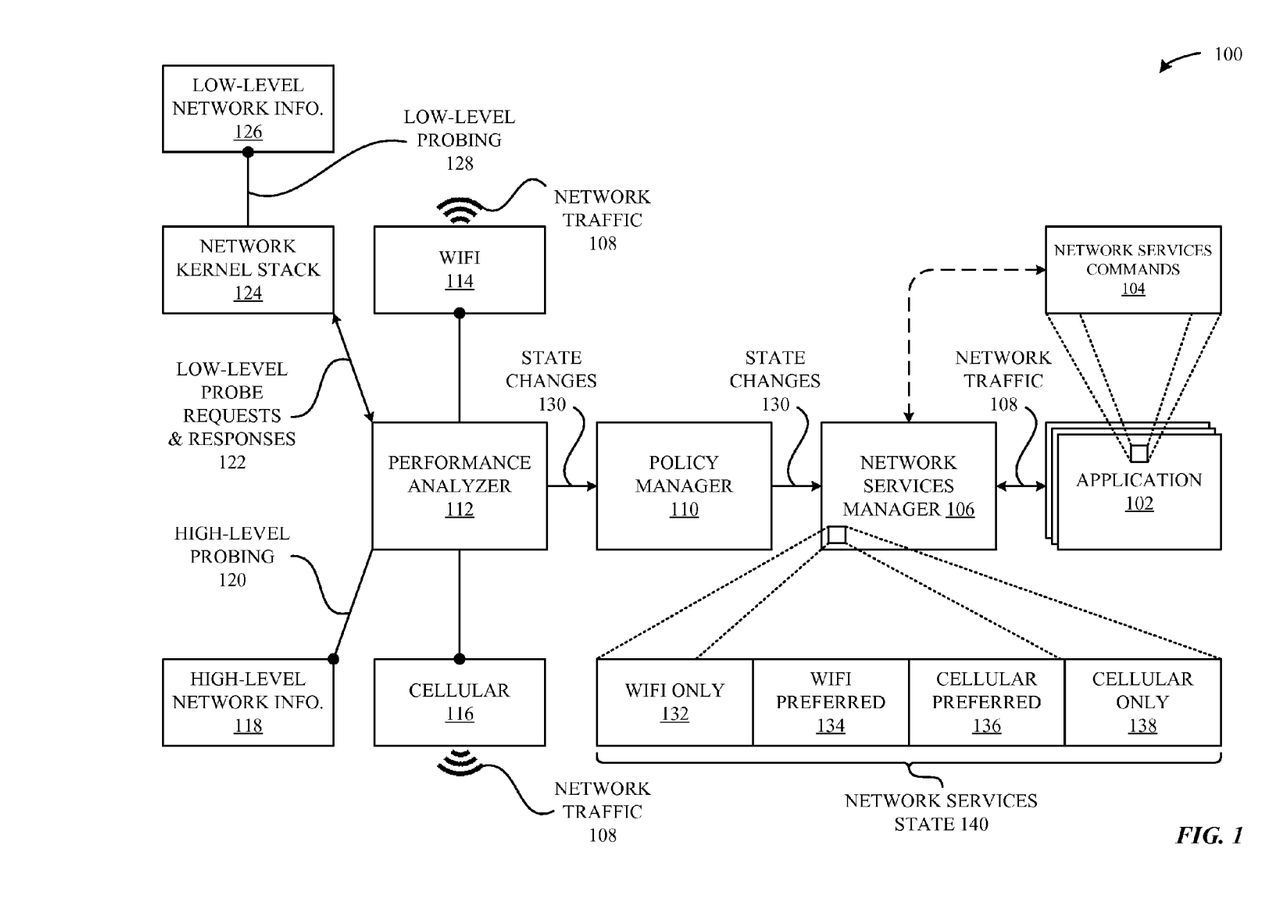
FIG. 1 illustrates a block diagram of different components of a mobile computing device configured to implement the various techniques described herein, according to some embodiments.

FIG. 1 illustrates a block diagram of different components of a mobile computing device 100 that is configured to implement the various techniques described herein, according to some embodiments. More specifically, FIG. 1 illustrates a high-level overview of the mobile computing device 100, which, as shown, can be configured execute different applications 102 (e.g., user applications, native operating system (OS) applications, OS daemons, etc.). As shown in FIG. 1, each application 102 can be configured to interface with a network services manager 106 by way of network services commands 104. According to some embodiments, the network services manager 106 can be configured to enable the applications 102 to utilize the communications capabilities that are available on the mobile computing device 100 (e.g., by way of the WiFi 114 component and the Cellular 116 component). According to some embodiments, the network services manager 106 can be configured as an Application Programming Interface (API) library of network connectivity functionalities, where the network services commands 104 represent different API calls that enable the applications 102 to establish network connections—illustrated in FIG. 1 as network traffic 108—with external entities (e.g., servers, peer mobile computing devices, etc.).

As shown in FIG. 1, the network services manager 106 can be configured to manage network services state 140, which can include different types of state that affect the manner in which network connections are established and utilized by the applications 102. For example, the network services state 140 can include, but is not limited to, WiFi only state 132, WiFi preferred state 134, Cellular preferred state 136, and Cellular only state 138. According to some embodiments, the WiFi only state can represent a conventional condition where network connectivity via the Cellular 116 component is disabled or no Cellular networks are available. Similarly, the Cellular only state 138 can represent a conventional condition where network connectivity via the WiFi 114 component is disabled or no WiFi networks are available. In contrast, and as described in greater detail herein, the WiFi preferred state 134 and the Cellular preferred state 136 can represent hybrid states where network connectivity using a particular component is preferred, but not mandatory. For example, applying the WiFi preferred state 134 within the mobile computing device 100 can involve causing both the WiFi 114 component and the Cellular 116 component to be active, where preference is given to using the WiFi 114 component over the Cellular 116 component when software applications executing on the mobile computing device 100 attempt to establish network connections (i.e., send/receive data). Providing preference can involve, for example, enforcing a bias (e.g., a ratio) for the WiFi 114 component when establishing new network connections (e.g., for every ten network connections that are established, attempt to establish seven of the ten connections using the WiFi 114 component and attempt to establish three of the ten connections using the Cellular 116 component). Conversely, applying the Cellular preferred state 136 within the mobile computing device 100 can involve causing both the Cellular 116 component and the WiFi 114 component to be active, where preference is given to using the Cellular 116 component over the WiFi 114 component when software applications executing on the mobile computing device 100 attempt to establish network connections. According to some embodiments, and as described in greater detail herein, the network services manager 106 can be configured to apply the WiFi preferred state 134 and the Cellular preferred state 136 in response to state changes 130 that are issued within the mobile computing device 100 in order to provide a more seamless transition between network connectivity when issues arise. As illustrated in FIG. 1, these state changes 130 can be issued by a performance analyzer 112 that is also configured to execute on the mobile computing device 100. A more detailed explanation of the performance analyzer 112 described below in conjunction with FIGS. 1-3.

As also shown in FIG. 1, the mobile computing device 100 can be configured to execute a policy manager 110 that enforces various policies that are specific to the applications 102. For example, configuration settings maintained by the policy manager 110 can indicate that a particular application 102 is not permitted to establish network connections using the Cellular 116 component (and instead is only able to utilize the WiFi 114 component). This can be beneficial, for example, when the particular application 102 is a high-definition (HD) video streaming application and a user of the mobile computing device 100 has a limited data allowance when carrying out communications over the Cellular 116 component. As described in greater detail below, the policy manager 110 can be configured to receive state changes 130 from the performance analyzer 112 so that the policy manager 110 can properly enforce existing policies within the mobile computing device 100 even when the state changes 130 are issued. For example, a state change 130 can cause the network services manager 106 to transition into the Cellular only state 138, which would otherwise force the particular application 102 described above to utilize the Cellular 116 component despite being expressly forbidden to do so in accordance with the configuration settings maintained by the policy manager 110. Accordingly, each of the policy manager 110 and the network services manager 106 are configured to be cognizant of the state changes 130 and operate in a manner that achieves the foregoing benefits of the techniques described herein without violating existing policies that the user expects the mobile computing device 100 to properly enforce.

As set forth above, the performance analyzer 112 can be configured to issue the state changes 130 that cause the policy manager 110 and the network services manager 106 to adjust the manner in which they operate. According to some embodiments, the performance analyzer 112 can be configured to carry out passive, high-level probing 120 of high-level network information 118. The high-level network information 118 can include, for existing or previous network connections maintained by the mobile computing device 100, Address Resolution Protocol (ARP) information, Domain Name System (DNS) information, historical WiFi connection information (e.g., Service Set Identifiers (SSIDs) of WiFi base stations and whether or not they are reliable), received signal strength indication (RSSI) information, Cellular connection information, and the like. The high-level network information 118 can also include, for each existing network connection maintained by the mobile computing device 100, whether the existing network connection is a "foreground" connection (e.g., is visible to the user—such as refreshing an email inbox in response to a user input) or a "background" connection (e.g., is not immediately visible to the user—such as performing a cloud backup when the mobile computing device is locked and its screen is turned off). The high-level network information 118 can further include Global Positioning System (GPS) information that indicates mobility information, e.g., whether the mobile computing device 100 is in motion or is stationary. This can be beneficial, for example, as a stationary mobile computing device 100 can indicate that a current quality of an existing network connection—as well as potential, new connections—is unlikely to change.

According to some embodiments, the performance analyzer 112 can also be configured to provide an active, low-level probing 128 of low-level network information 126. Specifically, and according to some embodiments, the performance analyzer 112 can be configured communicate low-level probe requests and responses 122 with the network kernel stack 124, which is a component that is capable of accessing low-level network information 126 within the mobile computing device 100. According to some embodiments, the network kernel stack 124 can be configured to perform a full or a partial analysis of the low-level network information 126 (e.g., in response to low-level probe requests and responses 122) and can communicate results of the analysis back to the performance analyzer 112. Alternatively, the network kernel stack 124 can be configured to provide the low-level network information 126 to the performance analyzer 112, whereupon the performance analyzer 112 can perform low-level probing 128 of the low-level network information 126. According to some embodiments, the low-level network information 126 can include Transmission Control Protocol (TCP) information for existing or previous network connections. For example, for an existing network connection, the TCP information can indicate whether a TCP connection was successfully established using the existing network connection, whether data packets are currently being transmitted over the existing network connection, and whether any response data packets have been received over the network connection. In some cases, it may not be immediately clear whether a corresponding response data packet should be received for a sent data packet, which can potentially establish false positive network connection issues when a lack of a response data packet misleadingly represents a faulty network connection. Accordingly, to cure this deficiency, the low-level probing 128 described herein can utilize keepalive packets that can help reduce or eliminate false positive network connection issues from rising.

Figure 2:
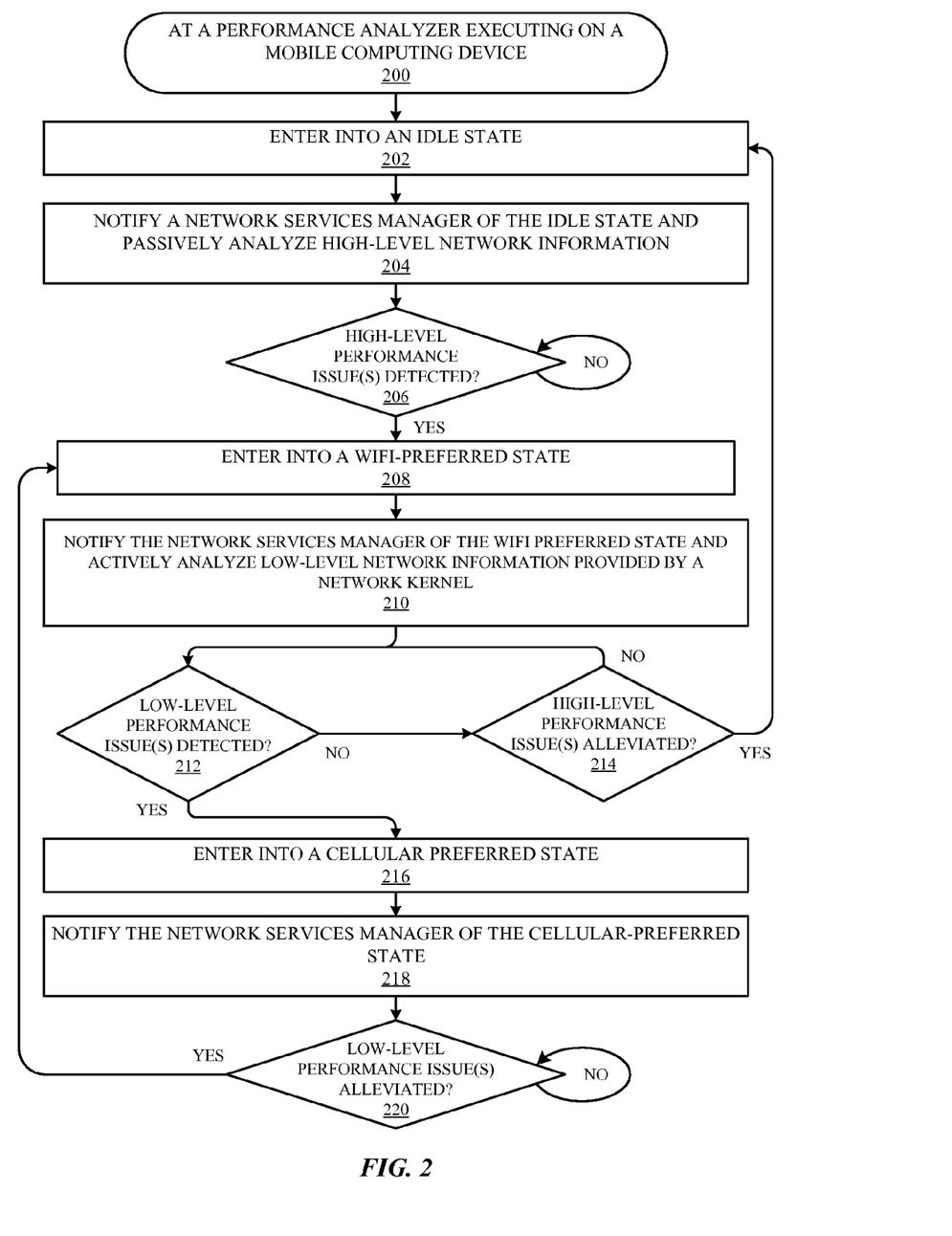
FIG. 2 illustrates a method that is implemented by the performance analyzer of FIG. 1, according to some embodiments.

FIG. 2 illustrates a method 200 implemented by the performance analyzer 112 of FIG. 1, according to some embodiments. As shown in FIG. 2, the method 200 begins at step 202, where the performance analyzer 112 enters into an idle state. According to some embodiments, the idle state represents a condition where components of the network services state 140 are not being enforced. For example, when the performance analyzer 112 is in the idle state, applications 102 can freely issue requests to the network services manager 106 to establish network connections using the network interfaces (e.g., WiFi 114 and Cellular 116) that are available on the mobile computing device 100 (so long as policies enforced by the policy manager 110 are not being violated). At step 204, the performance analyzer 112 notifies the network services manager 106 of the idle state and passively analyzes the high-level network information 118 described above in conjunction with FIG. 1. According to some embodiments, the passive analysis can represent an operating mode where only a small amount of processing overhead is involved and the overall operating efficiency and performance of the mobile computing device 100 is not compromised.

At step 206, the performance analyzer 112 determines, via high-level probing 120, whether any high-level performance issues are detected. High-level performance issues can occur, for example, when one or more components of the high-level network information 118 have values that violate particular thresholds (e.g., DNS issues, ARP issues, RSSIs below a certain level, detection of a WiFi connection to an SSID associated with historically poor performance, etc.). It is noted that the high-level network information 118 discussed herein is in no way limiting and is not constrained to networking information, and that the performance analyzer 112 can be configured to analyze other types of information that are available within the mobile computing device 100 when carrying out the high-level probing 120. If, at step 206, the performance analyzer 112 determines that any high-level performance issues are detected, then the method 200 proceeds to step 208. Otherwise, the method 200 repeats at step 206, where the performance analyzer 112 remains in the idle mode until any high-level performance issues are detected.

At step 208, the performance analyzer 112 enters into the WiFi-preferred state 134. At step 210, the performance analyzer 112 notifies (e.g., via a state change 130) the network services manager 106 of the WiFi-preferred state 134 and actively analyzes low-level network information 126 provided by the network kernel stack 124. In some embodiments, the network kernel stack 124 can be configured to share some of the responsibilities of the low-level probing 128 with the performance analyzer 112 in order to reduce the number of low-level probe requests and responses 122 that are communicated between the performance analyzer 112 and the network kernel stack 124.

At step 212, the performance analyzer 112 determines, via low-level probing 128, whether any low-level performance issues are detected. Low-level performance issues can occur, for example, when one or more components of the low-level network information 126 have values that satisfy particular thresholds (e.g., TCP timeouts, TCP packet loss, etc.). It is noted that the low-level network information 126 discussed herein is in no way limiting and is not constrained to networking information, and that the performance analyzer 112 can be configured to analyze other types of information that are available within the mobile computing device 100 when carrying out the low-level probing 128. If, at step 212, the performance analyzer 112 determines that any low-level performance issues are detected, then the method 200 proceeds to step 216, which is described below in greater detail. Otherwise, the method 200 proceeds to step 214.

At step 214, the performance analyzer 112 determines whether the high-level performance issues detected at step 206 have been alleviated. High-level performance issues can occur, for example, when the values of one or more components of the high-level network information 118 described above in conjunction with step 206 now satisfy the particular thresholds. If, at step 214, the performance analyzer 112 determines that the high-level performance issues detected at step 206 have been alleviated, then the method 200 proceeds back to step 202, which is described above in greater detail. Otherwise, the method 200 proceeds to back to step 212, which is also described above in greater detail.

At step 216, the performance analyzer 112 enters into the Cellular-preferred state 136. At step 218, the performance analyzer 112 notifies (e.g., via a state change 130) the network services manager 106 of the Cellular-preferred state 136. Step 218 can also involve the performance analyzer 112 notifying, via a state change 130, the policy manager 110 of the change in state to the Cellular-preferred state 136. At step 220, the performance analyzer 112 determines whether the low-level performance issues detected at step 212 have been alleviated. Alleviation of the low-level performance issues can occur, for example, when the values of one or more components of the low-level network information 126 described above in conjunction with step 212 now satisfy the particular thresholds. If, at step 220, the performance analyzer 112 determines that the low-level performance issues detected at step 212 have been alleviated, then the method 200 proceeds back to step 208, which is described above in greater detail. Otherwise, the method 200 repeats at step 220, where the performance analyzer 112, the policy manager 110, and the network services manager 106 remain in the Cellular-preferred state 136 until the low-level performance issues are alleviated.

Figure 3:
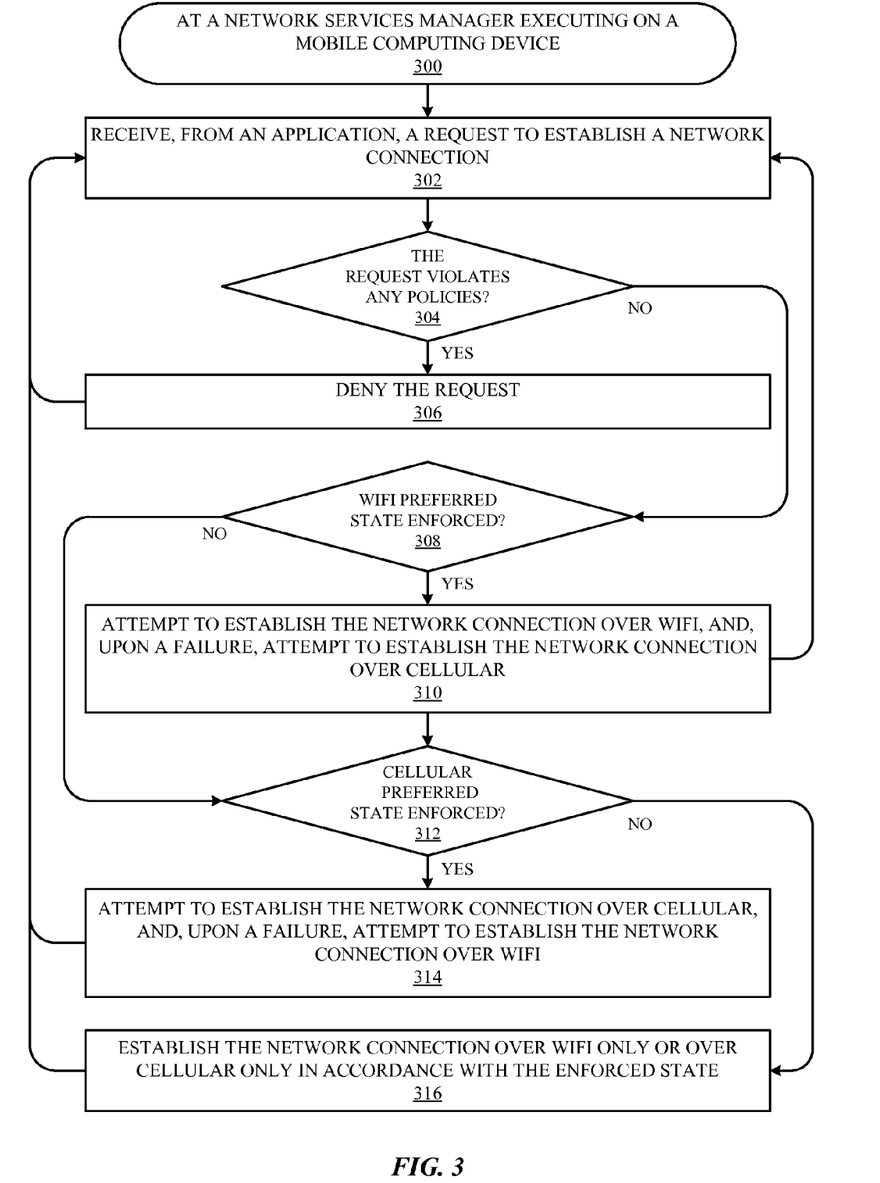
FIG. 3 illustrates a method that is implemented by the network services manager of FIG. 1, according to some embodiments.

FIG. 3 illustrates a method 300 implemented by the network services manager 106 of FIG. 1, according to some embodiments. As shown, the method 300 begins at step 302, where the network services manager 106 receives, from an application 102 executing on the mobile computing device 100, a request to establish a network connection. According to some embodiments, the request can be issued by the application 102 and received by the network services manager 106 by way of the network services commands 104 described above in conjunction with FIG. 1. According to some embodiments, the request can indicate a particular communications interface (e.g., the WiFi 114 component or the Cellular 116 component) through which the application 102 desires to establish the network connection. Alternatively, the request can indicate that a generic network connection is desired, and that the communications interface ultimately selected to establish the network connection does not particularly matter to the application 102.

At step 304, the network services manager 106 determines whether the request violates any policies. The network services manager 106 can carry out this determination, for example, by providing the request to the policy manager 110 and receiving a response from the policy manager 110 that indicates whether the request violates any policy. For example, the application 102 may request to establish a network connection over the Cellular 116 component when a WiFi connection is not available, which is in direct violation of policy that a user of the mobile computing device 100 established against the application 102. When this violation occurs, the network services manager 106 can issue a response to the application 102 indicating that the request cannot be fulfilled, where, in turn, the application 102 can reissue a request for a generic network connection or display a message to the user indicating that network connectivity cannot be achieved. If, at step 304, the network services manager 106 determines that the request violates any policies, then the method 300 proceeds to step 306, where the network services manager 106 denies the request. Otherwise, the method 300 proceeds to step 308.

At step 308, the network services manager 106 determines whether the WiFi preferred state 134 is being enforced. Again, the WiFi preferred state 134 can be enforced when the performance analyzer 112 identifies potential issues when carrying out high-level probing 120 of the high-level network information 118, which is described above in detail in conjunction with FIGS. 1-2. If, at step 308, the network services manager 106 determines that the WiFi preferred state 134 is being enforced, then the method 300 proceeds to step 310. Otherwise, the method 300 proceeds to step 312, which is described below in greater detail.

At step 310, the network services manager 106 attempts to establish, in accordance with the WiFi preferred state 134, the requested network connection using the WiFi 114 component. In the event that establishing the requested network connection using the WiFi 114 component succeeds, the method 300 can proceed back to step 302. Otherwise, upon a failure to establish the requested network connection using the WiFi 114 component, the network services manager 106 can be configured to attempt to establish the network connection over the Cellular 116 component. According to some embodiments, the network services manager 106 can be configured to track a number of failed attempts to establish the requested network connection using the WiFi 114 component, and, when the number satisfies a threshold value, the network services manager 106 can instead attempt to establish the requested network connection using the Cellular 116 component. According to some embodiments, the network services manager 106 can be configured to identify when a particular amount of time passes (e.g., a timeout period) when attempting to establish the requested network connection using the WiFi 114 component and transition to attempting to establish the requested network connection using the Cellular 116 component. In either case, the method 300 returns back to step 302, which is described above in greater detail.

At step 312, the network services manager 106 determines whether the Cellular preferred state 136 enforced. If, at step 312, the network services manager 106 determines that Cellular preferred state 136 enforced, then the method 300 proceeds to step 314. Otherwise, the method 300 proceeds to step 316, which is described below in greater detail. At step 314, the network services manager 106 attempts to establish the network connection over the Cellular 116 component. In the event that establishing the requested network connection using the Cellular 116 component succeeds, the method 300 can proceed back to step 302. Otherwise, upon a failure to establish the requested network connection using the Cellular 116 component, the network services manager 106 can be configured to attempt to establish the network connection over the WiFi 114 component. In either case, the method 300 returns back to step 302, which is described above in greater detail.

If step 316 is reached, it is implied that either the WiFi only state 132 or the Cellular only state 138 is being enforced, and the network services manager 106 can be configured to establish the network connection in accordance with the enforced state and the policies that are being enforced by the policy manager.

Figure 4:
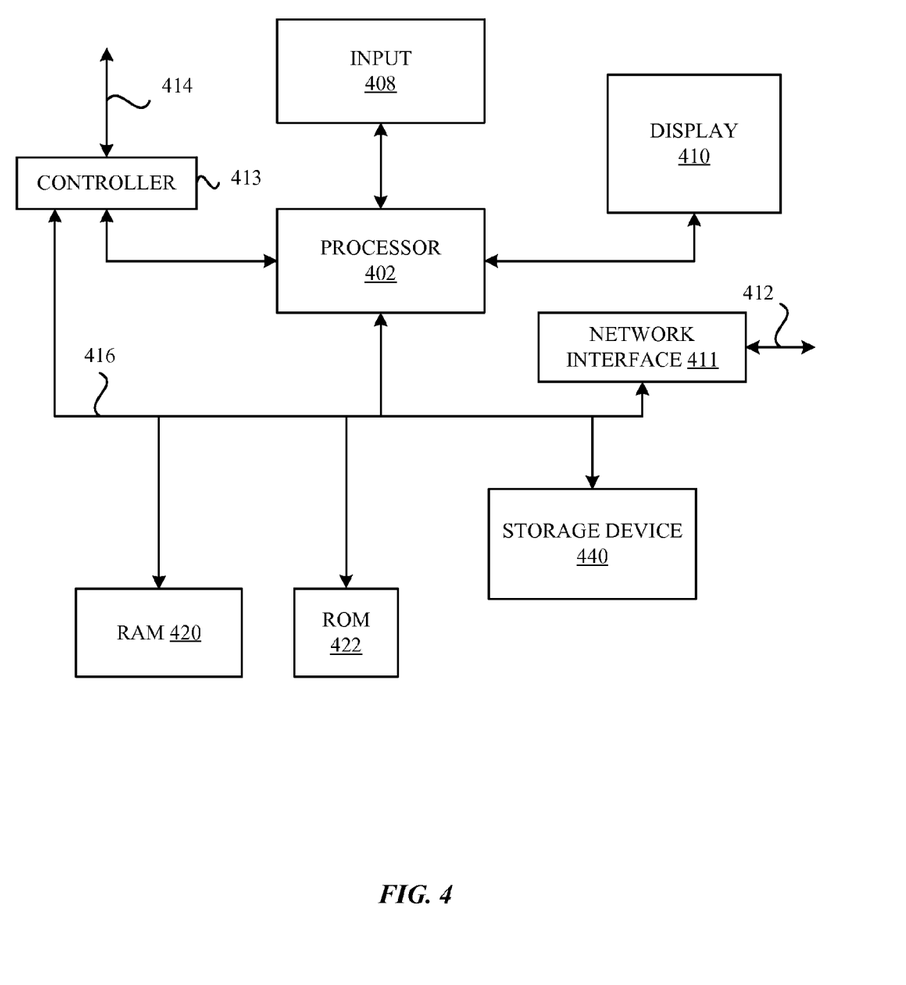
FIG. 4 illustrates a detailed view of a computing device that can be used to implement the various components described herein, according to some embodiments.

FIG. 4 illustrates a detailed view of a computing device 400 that can be used to implement the various components described herein, according to some embodiments. In particular, the detailed view illustrates various components that can be included in the mobile computing device 100 illustrated in FIG. 1. As shown in FIG. 4, the computing device 400 can include a processor 402 that represents a microprocessor or controller for controlling the overall operation of computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, etc. Still further, the computing device 400 can include a display 410 (screen display) that can be controlled by the processor 402 to display information to the user. A data bus 416 can facilitate data transfer between at least a storage device 440, the processor 402, and a controller 413. The controller 413 can be used to interface with and control different equipment through and equipment control bus 414. The computing device 400 can also include a network/bus interface 411 that couples to a data link 412. In the case of a wireless connection, the network/bus interface 411 can include a wireless transceiver.

The computing device 400 also include a storage device 440, which can comprise a single disk or a plurality of disks (e.g., hard drives), and includes a storage management module that manages one or more partitions within the storage device 440. In some embodiments, the storage device 440 can include flash memory, semiconductor (solid state) memory or the like. The computing device 400 can also include a Random Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of the computing device 400.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method performed by a communications interface performance analyzer executing on a mobile computing device, the method comprising:
    analyzing a first category of network connectivity information available within the mobile computing device;
    determining, based on analyzing the first category of network information, that first-level connectivity performance issues are occurring;
    while the first-level connectivity performance issues are occurring:
        receiving, from an entity executing on the mobile computing device, a request to establish a new network connection, wherein the entity does not specify a particular type of communications interface through which the new network connection is to be established, and
        establishing the new network connection in accordance with an operating state of the mobile computing device that corresponds to the first-level connectivity performance issues, wherein the operating state causes the mobile computing device to establish a higher number of new network connections over a first type of communications interface in comparison to other new network connections established over a second type of communications interface;
    analyzing a second category of network connectivity information available within the mobile computing device;
    determining, based on analyzing the second category of network information, that second-level connectivity performance issues are occurring; and
    while the second-level connectivity performance issues are occurring:
        updating the operating state to cause the mobile computing device to establish a higher number of new network connections over the second type of communications interface in comparison to other new network connections established over the first type of communications interface.

2. The method of claim 1, wherein updating the operating state comprises:
    notifying a network services manager executing on the mobile computing device to update a configuration state, wherein the network services manager affects a manner in which applications issue requests to establish new network connections.

3. The method of claim 1, wherein the first category of network connectivity information is analyzed by a background process that is not visible to a user of the mobile computing device.

4. The method of claim 1, wherein the first type of communications interface is a WiFi communications interface, and the second type of communications interface is a Cellular communications interface.

5. The method of claim 1, wherein the first category of network connectivity information is associated with existing network connections or previous network connections maintained by the mobile computing device, and the first category of network connectivity information includes Address Resolution Protocol (ARP) information, Domain Name System (DNS) information, and historical WiFi connection information.

6. The method of claim 5, wherein, for each existing network connection of the existing network connections maintained by the mobile computing device, the first category of network connectivity information indicates whether the existing network connection is a foreground connection or a background connection.

7. The method of claim 5, wherein the first category of network connectivity information further includes Global Positioning System (GPS) information that indicates whether the mobile computing device is in motion or is stationary.

8. The method of claim 1, wherein the second category of network information is managed within a network kernel stack.

9. The method of claim 8, wherein, when an application executing on the mobile computing device attempts to establish a new network connection, and configuration information maintained by a policy manager executing on the mobile computing device indicates that the second type of communications interface cannot be used by the application to establish new network connections, emphasis is instead placed on using the first type of communications interface.

10. The method of claim 8, wherein the second category of network connectivity information includes Transmission Control Protocol (TCP) information associated with existing network connections maintained by the mobile computing device, and, for each existing network connection of the existing network connections, the TCP information indicates:
 whether a TCP connection has been established using the existing network connection,
 whether one or more data packets are being transmitted over the existing network connection, and
 whether at least one response data packet has been received in accordance with at least one data packet of the one or more data packets when the at least one data packet aims to elicit one or more response data packets.

11. The method of claim 10, wherein at least one keepalive data packet is utilized to properly indicate whether the at least one response data packet has been received.

12. A non-transitory computer readable storage medium configured to store instructions that, when executed by a processor included in a mobile computing device, cause the mobile computing device to carry out steps that include:
 analyzing a first category of network connectivity information available within the mobile computing device;
 determining, based on analyzing the first category of network information, that first-level connectivity performance issues are occurring;
 while the first-level connectivity performance issues are occurring:
  receiving, from an entity executing on the mobile computing device, a request to establish a new network connection, wherein the entity does not specify a particular type of communications interface through which the new network connection is to be established, and
  establishing the new network connection in accordance with an operating state of the mobile computing device that corresponds to the first-level connectivity performance issues, wherein the operating state causes the mobile computing device to establish a higher number of new network connections over a first type of communications interface in comparison to other new network connections established over a second type of communications interface;
 analyzing a second category of network connectivity information available within the mobile computing device;
 determining, based on analyzing the second category of network information, that second-level connectivity performance issues are occurring; and
 while the second-level connectivity performance issues are occurring:
  updating the operating state to cause the mobile computing device to establish a higher number of new network connections over the second type of communications interface in comparison to other new network connections established over the first type of communications interface.

13. The non-transitory computer readable storage medium of claim 12, wherein the first category of network connectivity information is associated with existing or previous network connections maintained by the mobile computing device, and the first category of network connectivity information includes Address Resolution Protocol (ARP) information, Domain Name System (DNS) information, and historical WiFi connection information.

14. The non-transitory computer readable storage medium of claim 12, wherein the second category of network information is managed within a network kernel stack.

15. The non-transitory computer readable storage medium of claim 14, wherein, when an application executing on the mobile computing device attempts to establish a new network connection, and configuration information maintained by a policy manager implemented by the processor indicates that the second type of communications interface cannot be used by the application to establish new network connections, emphasis is instead placed on using the first type of communications interface.

16. A mobile computing device, comprising:
 a WiFi communications interface;
 a Cellular communications interface; and
 a processor configured to implement a performance analyzer that carries out steps that include:
  analyzing a first category of network connectivity information available within the mobile computing device;
  determining, based on analyzing the first category of network information, that first-level connectivity performance issues are occurring;
  while the first-level connectivity performance issues are occurring:
   receiving, from an entity executing on the mobile computing device, a request to establish a new network connection, wherein the entity does not specify a particular type of communications interface through which the new network connection is to be established, and
   establishing the new network connection in accordance with an operating state of the mobile computing device that corresponds to the first-level connectivity performance issues, wherein the operating state causes the mobile computing device to establish a higher number of new network connections over the WiFi communications interface in comparison to other new network connections established over the Cellular communications interface;

analyzing a second category of network connectivity information available within the mobile computing device;

determining, based on analyzing the second category of network information, that second-level connectivity performance issues are occurring; and while the second-level connectivity performance issues are occurring:

updating the operating state to cause the mobile computing device to establish a higher number of new network connections over the Cellular communications interface in comparison to other new network connections established over the WiFi communications interface.

17. The mobile computing device of claim 16, wherein the first category of network connectivity information is associated with existing or previous network connections maintained by the mobile computing device, and the first category of network connectivity information includes Address Resolution Protocol (ARP) information, Domain Name System (DNS) information, and historical WiFi connection information.

18. The mobile computing device of claim 16, wherein the second category of network information is managed within a network kernel stack.

19. The mobile computing device of claim 18, wherein, when an application executing on the mobile computing device attempts to establish a new network connection, and configuration information maintained by a policy manager implemented by the processor indicates that the Cellular communications interface cannot be used by the application to establish new network connections, emphasis is instead placed on using the WiFi communications interface.

20. The mobile computing device of claim 18, wherein the second category of network connectivity information includes Transmission Control Protocol (TCP) information associated with existing network connections maintained by the mobile computing device, and, for each existing network connection of the existing network connections, the TCP information indicates:

whether a TCP connection has been established using the existing network connection, whether one or more data packets are being transmitted over the existing network connection, and whether at least one response data packet has been received in accordance with at least one data packet of the one or more data packets when the at least one data packet aims to elicit one or more response data packets.

21. The mobile computing device of claim 20, wherein at least one keepalive data packet is utilized to properly indicate whether the at least one response data packet has been received.

* * * * *